(12) United States Patent
Wolf et al.

(10) Patent No.: US 7,760,335 B2
(45) Date of Patent: Jul. 20, 2010

(54) DEVICE AND METHOD FOR OPTICALLY MEASURING DISTANCE WITH DETECTOR HAVING PHOTOSENSITIVE SURFACES

(75) Inventors: Peter Wolf, Leinfelden-Echterdingen (DE); Uwe Skultety-Betz, Leinfelden-Echterdingen (DE); Clemens Schulte, Stuttgart (DE); Joerg Stierle, Waldenbuch (DE); Bjoern Haase, Stuttgart (DE); Kai Renz, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/162,836

(22) PCT Filed: Feb. 8, 2007

(86) PCT No.: PCT/EP2007/051193

§ 371 (c)(1),
(2), (4) Date: Jul. 31, 2008

(87) PCT Pub. No.: WO2007/107408

PCT Pub. Date: Sep. 27, 2007

(65) Prior Publication Data

US 2009/0009747 A1    Jan. 8, 2009

(30) Foreign Application Priority Data

Mar. 23, 2006 (DE) .................. 10 2006 013 290

(51) Int. Cl.
*G01C 3/08* (2006.01)

(52) U.S. Cl. .................... 356/4.01; 356/5.01

(58) Field of Classification Search ............... 356/4.01, 356/5.01, 28
See application file for complete search history.

(56) References Cited

U.S. PATENT DOCUMENTS

| 6,301,003 | B1 * | 10/2001 | Shirai et al. | 356/4.01 |
| 6,603,534 | B2 | 8/2003 | Seifert et al. | |
| 6,671,037 | B2 * | 12/2003 | Isogai et al. | 356/4.01 |
| 6,833,909 | B2 | 12/2004 | Schmidt et al. | |
| 7,333,182 | B2 * | 2/2008 | Tanaka et al. | 356/4.01 |
| 7,532,311 | B2 * | 5/2009 | Henderson et al. | 356/4.01 |

FOREIGN PATENT DOCUMENTS

| DE | 100 51 302 | 4/2002 |
| DE | 101 30 763 | 1/2003 |
| EP | 0 837 301 | 4/1998 |

* cited by examiner

*Primary Examiner*—Isam Alsomiri
(74) *Attorney, Agent, or Firm*—Michael J. Striker

(57) ABSTRACT

A device for optically measuring distance, in particular a hand-held device, comprising an transmission unit (12) which is provided with a light source (17, 18) for emitting optical measuring radiation (13, 20, 22) towards a target object (15), and a capturing unit (14) which is arranged at a distance from the optical axis (38) of the transmission unit (12). The capturing unit (14) comprises at least one optical detector (54) for capturing optical radiation (16, 49, 50) reflected by the target object (15). The detector (54) of the capturing unit (14) comprises a plurality of light-sensitive surfaces (70, 72, 74; 170, 172, 174; 270, 272, 274; 370, 372; 470, 472; 570, 572) which are separated from each other and which are be activated separately. The invention also relates to a method for operating a device for optically measuring distance.

12 Claims, 4 Drawing Sheets

DEVICE AND METHOD FOR OPTICALLY MEASURING DISTANCE WITH DETECTOR HAVING PHOTOSENSITIVE SURFACES

CROSS-REFERENCE TO A RELATED APPLICATION

The invention described and claimed hereinbelow is also described in German Patent Application DE 10 2006 013 290.4 filed on Mar. 23, 2006. This German Patent Application, whose subject matter is incorporated here by reference, provides the basis for a claim of priority of invention under 35 U.S.C. 119(a)-(d).

BACKGROUND OF THE INVENTION

Optical distance-measuring devices as such have been known for a long time, and they are now sold commercially in large quantities. These devices emit a modulated light beam that is directed toward the surface of a desired target object whose distance from the device is to be determined. A portion of the returning light that has been reflected or scattered by the target object is detected by the device, and it is used to determine the distance in question.

The application range of distance-measuring devices of this type generally ranges from a few centimeters to several hundred meters.

Depending on the paths to be measured and the reflectance of the target object, different requirements result for the light source, the quality of the measurement beam, and the detector.

The optical distance-measuring devices known from the related art basically belong to two categories, depending on the configuration of the transmission and reception channels present in the device.

In one category, there are devices with which the transmission channel is located a certain distance away from the reception channel, so that the optical axes extend in parallel with each other but a distance away from each other. The other category includes monoaxial measuring devices with which the reception channel extends coaxially with the transmission channel.

The former, bi-axial measurement systems have the advantage that a complex beam-splitting system is not required to select the returning measurement signal, thereby also enabling, e.g., optical crosstalk from the transmission path directly into the reception path to be suppressed to a greater extent.

Bi-axial distance-measuring devices have the disadvantage, however, that detection problems may arise when performing close-range distance measurements, due to a parallax. In this case, the image of the target object on the detector surface—the image being located unambiguously on the detector even when target distances are great—moves increasingly further away from the optical axis of the reception path as the measurement distance decreases, and the beam cross-section in the detector plane changes markedly.

As a result, the measurement signal that is detected may approach zero in the close range of detection, i.e., when the distance between the target object and the measuring device is short, if no further measures are taken in the device.

Although measuring devices of this type may be optimized for a certain distance range, this requires that the measuring range that is actually accessible to the measuring device be limited substantially.

Publication DE 10 130 763 A1 makes known a device for optically measuring distance over a large measuring range that includes a transmission unit with a light source for emitting modulated, optical radiation toward a target object, and with which the receiving unit that includes an optical detector located in this measuring device—which serves to receive the optical radiation returning from the target object—is located on a reception axis, which is located a distance away from the optical axis. The active, photosensitive surface of the detector of the reception unit described in DE 10 130 763 A1 tapers in the direction of a beam displacement for decreasing target object distances that results due to a parallax of the returning measurement radiation.

Publication DE 10 051 302 A1 makes known a laser distance-measuring device for the short- and long-range that includes a special receiver with a transmission channel and a reception channel. The transmission channel is composed of a transmission lens, in whose focal point a laser light source is located. The reception channel is composed of a reception lens, in whose focal plane a receiver system is located. The optical axes of the transmission lens and the reception lens extend in parallel with each other for a finite distance. The receiver system of the laser distance-measuring device described in DE 100 51 302 A1 is a photodiode chip system with at least two active photodiode surfaces located on a straight line that intersects the optical axes of the transmission and reception lens of this device.

SUMMARY OF THE INVENTION

The object of the present invention is to ensure—based on a device for optically measuring distance according to the related art—that the most constant reception signal possible may be measured across the largest possible measuring range.

The inventive device for optically measuring distance includes a transmission unit with a light source for emitting optical radiation, in particular modulated optical measurement radiation, and a reception unit, which is located a distance away from the optical axis of this transmission unit and includes at least one optical detector. The detector of the reception unit advantageously includes a plurality of separated—electrically separated, in particular—photosensitive surfaces, which may be activated separately when the device is operated.

The photosensitive surface of an optical detector, which is typically composed of at least one semiconductor material, may be activated via the application of voltage. This means that light that strikes the photosensitive surface of the detector is converted into an electrical signal and may therefore be detected using a downstream electronic circuit.

To this end, the inventive device includes switching means with which one or more subregions of the photosensitive surface of the detector may be switched on or off.

When photodiode surfaces that are not used or are used only partially are switched off, the noise that is basically produced due to the extraneous light that strikes the detector may be markedly reduced, since only those photosensitive surfaces are used that receive the light that is essentially usable for the measurement. In particular, it is advantageously possible to activate only a single photosensitive surface.

In addition, the electrical capacitance of the photodiode and, therefore, of the detection system decreases, since the photodiode surface that is active during operation is smaller. The photodiode may therefore be operated at a higher frequency, which results in greater measurement accuracy of the inventive device for optically measuring distance.

It is therefore possible to expand the measuring range that is accessible to this measuring device in a simple, reliable manner.

SUMMARY OF THE INVENTION

Advantageously, only that photosensitive surface or those photosensitive surfaces of the plurality of photosensitive surfaces of the detector are active that receive the largest portion of returning optical measurement radiation. It is therefore possible to detect a measurement signal that is sufficiently strong, while also markedly reducing the portion of extraneous light that strikes the unused regions of the photosensitive surface of the detector. This results in a better signal-to-noise ratio in the detected measurement signal, thereby making it possible to greatly improve the resolution of the measuring device and the distance range that is accessible to the measuring device.

The inventive device includes means with which individual photosensitive surfaces of the detector may be switched on or off. Particular photosensitive regions may be activated, e.g., by guiding a connection to the outside, that is, out of the diode housing, for instance, when a common ground exists. Via the contacting of the connection, it is therefore possible to influence which of the surfaces is activated and should therefore be used. As an alternative, it is possible to integrate a multiplexer directly in the photodiode when several surfaces are involved.

In an advantageous embodiment, the envelope of the photosensitive surfaces of the detector tapers in the direction of a beam displacement for decreasing target object distances that results due to a parallax of the returning measurement radiation. The envelope is a hypothetical curve that may be placed around the edge of the photosensitive surfaces of the detector at a minimal distance. In this manner it may be ensured that adequate measurement signal strikes that portion of the detector that is active, for every object distance. In particular, the shape of the overall optical detection area is selected such that a signal with a sufficient amplitude is present on the detector surface, even at close range. This results in a further improvement of the ratio of useful light to extraneous light, thereby increasing the measurement accuracy of the device in the immediate close range for this reason as well, and therefore expanding the measuring range that is accessible to the device.

In an advantageous embodiment, the envelope may also expand in the direction of the beam displacement for decreasing target object distances that results due to a parallax of the returning measurement radiation. This may compensate, in particular, for the effect of the enlarged measurement beam diameter as object distances decrease.

The envelope of the photosensitive surfaces of the detector advantageously has a symmetry axis, which lies in the common plane of the optical axes of the transmission unit and the reception unit of the device. Given that the measurement beam that returns from the target object travels laterally in the common plane of the optical axes of the transmission unit and the reception unit as the object distance decreases, the detector will advantageously have an enlongated shape in this direction. In this manner, the dependence of the direction of the returning measurement signal on the distance of the measuring device from a target object is taken into account. The size of the photosensitive surfaces of the detector of the reception unit is selected such that a sufficient amount of the signal, e.g., also in the close range, still strikes the particular active subregion of the detector.

This also advantageously makes it possible to account for the dependence of the strength of the returning measurement signal on the distance of the measuring device from the target object.

Due to the inverse square law for the change in intensity as a function of the path covered, the returning measurement signal is much greater for the close range than it is for target objects located far away from the measuring device.

The expansion of the envelope of all photosensitive surfaces of the detector perpendicular to the common plane of the optical axes of the transmission unit and the reception unit may therefore decrease to the extent at which the light signal increases due to the shorter path at close range. This also has the advantage that, due to the reduced expansion of the detector, a sufficient amount of light from close range may still strike the detector, but it may not be possible for the light from close range to override the detector, given that its active photosensitive surfaces become smaller in this direction.

This effect is limited by the opposite effect, namely, that, due to the poorer focussing of the returning measurement beam bundle at shorter object distances, the diameter of the measurement beam bundle increases greatly, and the energy density of the returning measurement signal that occurs on a small detector surface could also possibly become too small. In a case such as this, a detector is advantageous with which the envelope of the photosensitive subregions of the detector do not taper in the direction of the beam displacement as object distances decrease, but expand instead.

In terms of the size of the surface of the detector and/or the size of the individual, sensitive subregions of the detector, it should only be ensured that the active surface, i.e., an active surface in the range of the detector in which light from distant target objects strikes the detector surface, is great enough to detect the entire signal, if possible, in this case, since remote measurement objects result in a relatively weak detection signal. This is also a consequence of the inverse square law, on which the detected intensity is based.

The lateral expansion of the active surfaces of the detector should therefore be large enough that a sufficient amount of light from the immediate close range of detection still reaches the particular active detection area. Due to the high signal level that results from short paths at close range, it is not necessary in this case to detect the entire signal intensity.

A further advantage of the claimed device is the fact that the electrical-capacitive properties of the detector of the measuring device are positively influenced, due to the inventive shape of the active detection areas. If the active detector area were too large, the electrical capacitance of the detector would increase, and the response characteristic over time, or, as an equivalent, the frequency response of the measurement system, would no longer correspond to the necessary requirements of the time and frequency resolution of the measurement system.

The inventive device for optically measuring distance may be advantageously realized by using a laser, in particular a laser diode, as the light source. Lasers and, in particular, laser diodes, are now available at favorable prices across the entire visible spectral range of electromagnetic waves. Due to their compact size and relatively high output powers, laser diodes are suited for use in devices for optically measuring distance, in particular in hand-held devices of this type.

The inventive device for optically measuring distance therefore makes it possible to generate the most constant reception and detection signal possible over a large measuring range of distances between the device and a target object.

Further advantages of the inventive device are presented in the drawing below, and in the associated description of an exemplary embodiment of the inventive device.

Exemplary embodiments of the inventive device are shown in the drawing. The description, associated figures, and the claims contain numerous features in combination. One skilled in the art will also consider these features—and, in particular, the features of various exemplary embodiments—individually, and will combine them to form further reasonable combinations.

DESCRIPTION OF THE PREFERRED EMBODIMENTS

Figure 1:
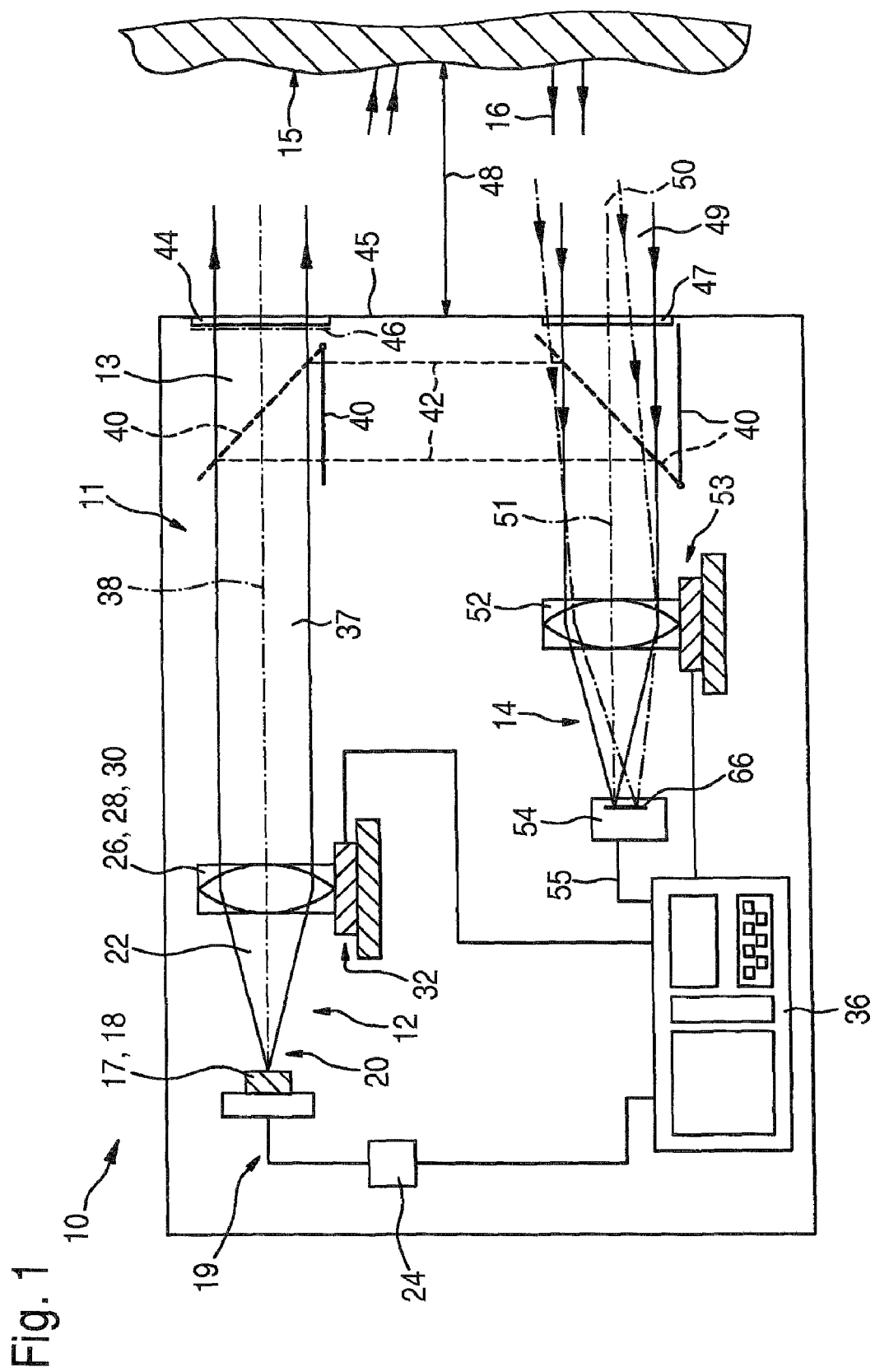
FIG. 1 shows a schematicized view of an exemplary embodiment of an inventive device for optically measuring distance.

FIG. 1 is a schematic view of an inventive device for optically measuring distance, including the most important components, whose function will be described. Inventive device 10 includes a housing 11, in which a transmission device 12 for generating a measurement signal 13, and a reception device 14 for detecting measurement signal 16 returning from a target object 15 are located.

Transmission device 12 includes a light source 17, which is realized as a semiconductor laser diode 18 in the exemplary embodiment shown in FIG. 1. It is also possible to use other light sources in the inventive device. Laser diode 18 emits a laser beam 20 in the form of a light bundle 22 that is visible to the human eye.

Laser diode 18 is operated via a control device 24, which generates a modulation of electrical input signal 19 of diode 18 via appropriate electronics. Via a modulation of the diode current that is carried out in the manner, it is ensured that optical measurement signal 13—which is used to measure distance—is also modulated in a desired manner.

Laser beam bundle 20 then passes through collimation optics 26 designed as a lens 28, which is depicted simply as a single lens 30 in FIG. 1. In this exemplary embodiment, lens 28 is optionally located on an adjustment device 32, which serves basically to change the position of the lens in all three spacial directions, e.g., for adjustment purposes.

As an alternative, collimation optics 26 may be a component of laser diode 18, or it may be fixedly connected therewith.

After passing through lens 28, an, e.g., amplitude-modulated signal 13 results in the form of a parallel light bundle 37, which propagates along optical axis 38 of transmission unit 12, as depicted schematically in FIG. 1. A preferably switchable beam deflector 40 is also located in transmission branch 12 of the inventive device that makes it possible to redirect measurement signal 13 to reception unit 14 of device 10 directly, i.e., inside the device, and to avoid a target object. In this manner, a reference path 42 inside the device is created, which may be used to calibrate or compensate for the measurement system.

When a distance measurement is carried out using the inventive device, measurement beam 13 leaves housing 11 of the inventive device via an optical window 44 in front wall 45 of device 10. The opening of the optical window may be secured, e.g., with a shutter 46. To perform the measurement, measuring device 10 is pointed at a target object 15, whose distance 48 from the measuring device is to be determined. Signal 16, which is reflected or scattered on target object 15, forms a returning ray bundle 49 or 50, a certain portion of which returns to measuring device 10.

Returning measurement radiation 16 is coupled into the measuring device through an entrance window 47 in front side 45 of device 10. In the exemplary embodiment shown in FIG. 1, measurement radiation 16 is deflected to reception optics 52.

Two returning measurement beam bundles 49 and 50 for two different target object distances 48 are sketched in FIG. 1, as an example and for purposes of illustration. For large object distances—with "large" in this case meaning large compared with the focal distance of reception optics 52—signal 16 that is returning from the target object enters parallel to optical axis 51 of reception device 14. In the exemplary embodiment depicted in FIG. 1, this case is represented by measurement beam bundle 49. As the object distance decreases, returning signal 16 that enters the measuring device becomes increasingly slanted relative to axis 51 of reception unit 14, due to a parallax. Beam bundle 50 is drawn in FIG. 1 as an example of a returning measurement beam bundle of this type located within close range of the distance-measuring device.

Reception optics 52, which are also depicted only schematically as a single lens in the exemplary embodiment in FIG. 1, collimates returning measurement signal 16 and focuses its beam bundle on photosensitive surface 66 of a reception detector 54. Detector 54 includes—in order to detect the optical measurement radiation—at least one photodiode, e.g., a PIN diode, an APD (Avalanche Photo Diode), or at least one CCD chip, as the photosensitive element 66. Of course, other surface detectors known to one skilled in the technical art may also be used as reception detectors. The surface detector is typically oriented such that its active photosensitive surface 66 is perpendicular to the optical axis of the reception branch. The incident optical signal is converted by reception detector 54 into an electrical signal 55, and it is sent to the inventive device for further evaluation in an evaluation unit 36.

Reception optics 52—which are also mounted on adjustment device 53 in the exemplary embodiment in FIG. 1, but is not limited thereto—are located approximately at the distance of their focal width away from active surface 66 of the detector, so that incident radiation arriving from a target object located far away from the measuring device is focused exactly on the detector or the active photosensitive surfaces.

When the distances from the target object are small, it should be noted, however, that the image position of the measurement spot that is reflected or scattered on the target object is located increasingly further away from the focal point of the reception lens. For example, as the distance between the target object and the measuring device decreases, the returning measurement beam travels increasingly further away from the optical axis of the reception device, thereby deviating more and more from the optical axis of the transmission device. In addition, the returning measurement beam bundle is no longer focused exactly on the detector surface, due to the changed imaging conditions on the reception lens. As the target object distance decreases, the size of the measurement spot on the detector surface increases.

Additional components located in the measuring device that are not related to what is required to understand the inventive device will not be discussed further in this context. It should merely be noted that the measuring device also includes a control and evaluation unit 36, of course.

Figure 2:
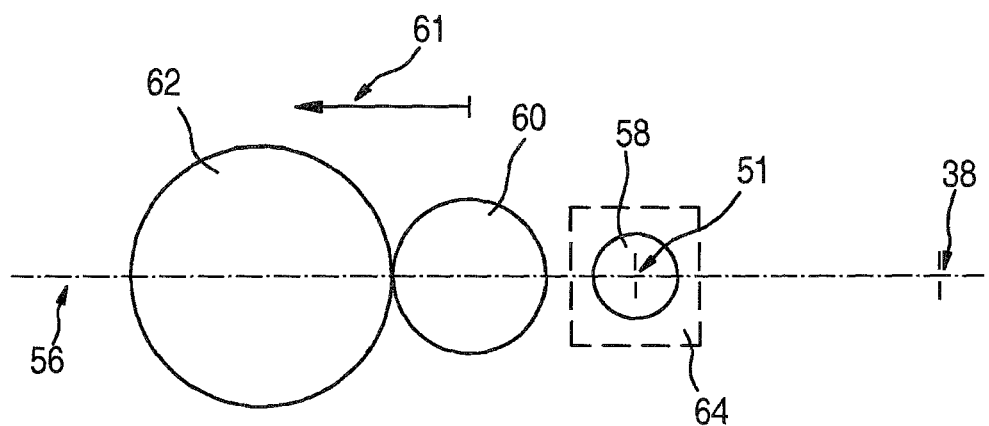
FIG. 2 shows a schematicized depiction of the variation of the measurement beam bundle in the detection plane when the distance of the object to be measured varies.

The relationships between the distance of the target object from the measuring device and the position and size of the measurement spot on the detector surface are depicted schematically in FIG. 2 as an overview. FIG. 2 shows a top view of a detector surface 64 per the related art in the direction of view of measurement signal 16, which is returning from the measurement object. Reference numeral 56 labels the common plane of optical axis 38 of transmission unit 12 and optical axis 51 of reception unit 14. Measurement spot 58 of returning radiation 16 for very large object distances 48 is located on optical axis 51 of reception unit 14 and is focused on surface 64 of the detector, forming a small spot. Since detector 54 is located approximately at the distance of the focal width of reception optics 52, light that comes from infinity, optically speaking, is focused directly on the detector surface, due to the principles of optical imagery. To illustrate the relationships, a "classical" detector surface 64 of a detector per the related art is shown as a dashed line in FIG. 2.

As distance 48 of measuring device 10 from target object 15 decreases, returning signal 16 strikes reception lens 52 at an increasing slant, so that the measurement spot on the detector surface also travels in the direction of arrow 61 in FIG. 2.

Measurement spot 60 for a short object distance 48 of target object 15 from measuring device 10, which is also sketched in FIG. 2, has therefore traveled away from optical axis 51 of the reception device, and it is greatly enlarged in terms of its expansion, in particular its lateral expansion.

When measurement distance 48 of measurement object 15 from the measuring device is very short, a measurement spot 62 of returning measurement signal 16 appears in the detector plane, which is also markedly increased in size and also appears further away from optical axis 51 of reception unit 14. A displacement of this type of the measurement spot to be detected with relative distance 48 of a measurement object 15 from measuring device 10 may result—for very short object distances—in returning signal 16 no longer striking the active surface of measurement receiver 54, as indicated by dashed surface 64 of a "classical" measurement receiver shown in FIG. 2.

To account for the variation in size and position of the measurement spot in the detection plane of reception unit 14, active photosensitive surface 66 of inventive detector 54 is designed accordingly and will be described in greater detail below.

Figure 3:
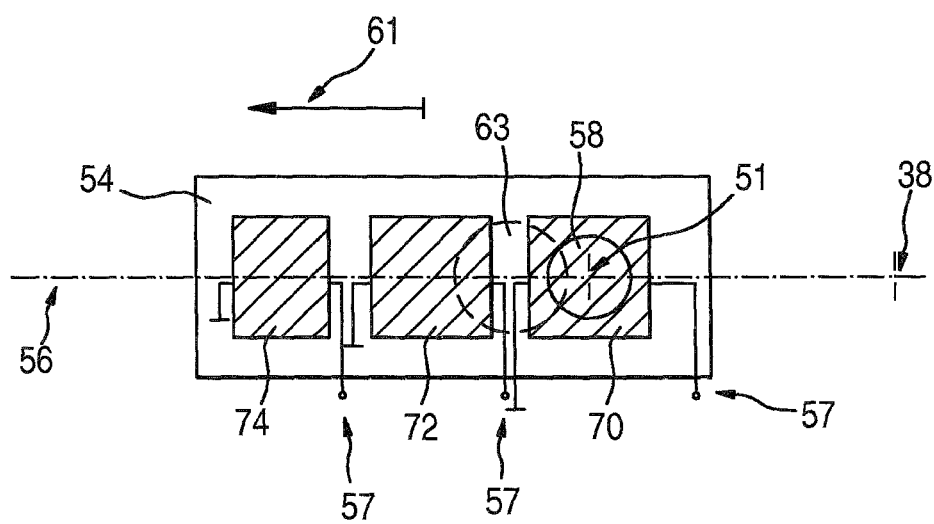
FIG. 3 shows a view of the detector surface of an inventive device.

FIG. 3 shows a first exemplary embodiment of photosensitive surface 66 of a detector of the inventive device. In this case, detector 54 of reception unit 14 includes a plurality of photosensitive surfaces 70, 72, and 74, which are separated from each other and, in entirety, form photosensitive surface 66 of the detector. In particular, the photosensitive surfaces of the detector are electrically separated from each other, thereby making it possible to actively switch only one of the photosensitive surfaces 70 through 74 at a time, that is, e.g., to apply a voltage signal to it, thereby enabling the incident light to be converted to an electrical signal. Subregions 70, 72, and 74 of the detector may all have the same size, i.e., surface area, in particular, or they may be designed with different sizes.

To activate a photosensitive subregion of the detector, a connection for each surface may be guided out of the diode housing, for example, thereby making it possible to trigger and selectively use the particular photosensitive subelement via a contacting or triggering of a connection of this type. This is indicated via electrical connection lines 57 depicted symbolically in FIGS. 3 through 8. To this end, appropriate switching means are provided that make it possible to activate the preferred subregion or subregions of detector 54 depending on the control signal. As an alternative, when several surfaces are involved, a multiplexer could also be integrated directly in detector 54, e.g., in a photodiode.

For very large object distances 48 between target object 15 and measuring device 10, measuring spot 58 comes to rest entirely on photosensitive subregion 70. In this case, i.e., for large measurement distances, only photosensitive surface 70 would be activated using appropriate switching means, thereby enabling it to function as a detector surface and convert the optical measurement signal into an electrical measurement signal. Subregions 72 and 74 of the detector, which are also present, are not activated. No voltage is applied to these photosensitive surfaces, for example. Light that strikes these surfaces therefore does not cause an electrical signal to be generated. If extraneous light from other objects that are located closer to the measuring device than object 15 to be measured at this time would enter the measuring device, this extraneous light would not be detected, because photosensitive surfaces 72 and 74 are not activated, i.e., they are not switched on. This extraneous light would therefore not contribute to increased background noise relative to the measurement signal from active surface 70 generated by measurement bundle 58.

Active surface 70, which has been activated in particular for very large measurement distances, advantageously has a lateral expansion in the detection plane such that it ensures that measurement spot 58 of measurement radiation 16 or 49 returning from a remote target object of this type is detected in entirety. A direction that is perpendicular to the measurement signal direction is the lateral direction in this case. The dimensions of photosensitive surfaces 70 should therefore be essentially the same or slightly larger than the dimensions of a measurement spot 58 for very large object distances. If—as object distance 48 decreases—the measurement spot now travels away from original reception axis 51, in the direction of arrow 61, then the diameter and/or the lateral expansion of the measurement spot increases, as illustrated in FIG. 2. The lateral direction is the direction perpendicular to direction 61, in which the measurement beam bundle travels.

The surface detector has an elongated shape overall in direction 61 of a beam displacement, as target object distances 48 decrease. The expansion in the direction of travel of the measurement signal is greater—and is much greater, in particular—than it is in the orthogonal, i.e., lateral direction.

When the returning measurement beam bundle travels, a situation arises in which the measurement beam bundle passes at least partially over, e.g., parts of both photosensitive surface 70 and 72, as indicated in FIG. 3 using measurement spot 63, which is shown as a dashed line. In a situation such as this, an appropriate measurement technique is used to detect which photosensitive surface 70 or 72 receives the larger portion of the reflected measurement beam bundle (bundle 63 in this case), so that, when a distance measurement is carried out in this configuration, only that photosensitive surface (70 or 72 in this case) may be activated that receives the largest portion of returning radiation. By switching off photodiode surfaces that are not used or are used only partially, the noise that is produced due to extraneous light may therefore be markedly reduced, since only those subregions of the detector are used that receive the useful light in an optimal manner. Those surfaces of the detector that have a relatively large portion of extraneous light are therefore switched off. In determining a distance from a target object 15, only one photosensitive surface of the detector is therefore active, in this embodiment in particular. In alternative embodiments, several subregions may also be activated, in particular when the measurement signal strikes several subregions simultaneously and, e.g., the sum signal of two subregions contains less noise than the signal of the particular subregions that are considered individually. In this case, several subregions of the detector may also be activated, according to the present invention.

To determine that surface or subregion that has the highest portion of useful light and, therefore, the highest signal-to-noise ratio, a short test measurement may be carried out before the actual distance measurement is performed, which serves merely to determine the signal components on the individual photosensitive surfaces of the detector of the reception unit. While this test measurement is being carried out, it is possible to activate all or a majority of the photosensitive subregions of the optical detector, and to read them out individually, in particular, using switching means provided for this purpose. In this manner, it may be determined which photosensitive subregion is receiving the strongest light signal, in order to decide whether only a single surface should be activated, or whether several surfaces—which represent a true partial quantity of all available photosensitive surfaces—yield a better measurement signal, in particular a better signal-to-noise ratio.

When measurement distance 48 of a measurement object 48 from measuring device 10 is very short, and the measurement spot will therefore travel further in the direction of arrow 61 in FIG. 3, it is possible, e.g., according to the present invention, to only activate photosensitive surface 74, and to switch off photosensitive surface 70—which receives no light or only partial light—and to switch off photosensitive surface 72, which receives only partial light.

Figure 4:
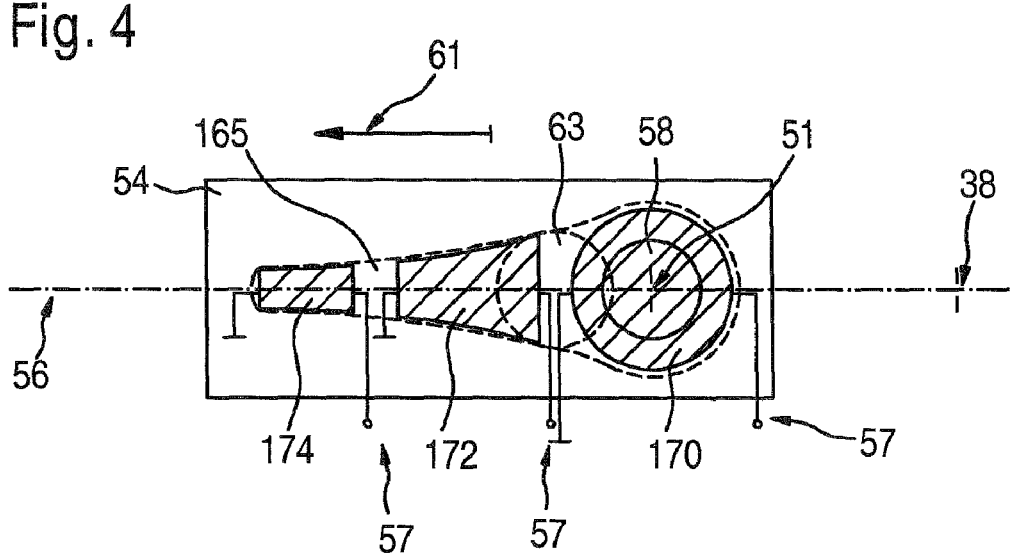
FIG. 4 shows a view of an alternative embodiment of a detector for an inventive device, in a schematic depiction.

FIG. 4 shows an alternative embodiment of inventive detector 54, with which an envelope 165, which may be placed or drawn around the photosensitive surfaces of the detector, tapers in direction 61, i.e., in the direction of travel of the returning measurement beam bundle for a decreasing measurement object distance.

The expansion of photosensitive surfaces 170, 172 or 174 of the detector in the direction perpendicular to optical axis 51 of reception unit 14 is advantageously at least so great that the measurement beam returning from a target object 15 at close range still strikes photosensitive surface 174 at least partially. This means, in particular, that, when distances 48 to a target object 15 are short, photosensitive surface 174 used with distances of this type may also selected to be much smaller, given that the light intensity will be much greater, due to the inverse square law. This advantageously results in a reduction in the electrical capacitance of the detector, so that the response characteristic over time and/or, analogously, the frequency response of the measurement system may be markedly increased.

Envelope 165, which may be placed or drawn around the photosensitive surfaces of the detector in the detector plane, therefore advantageously tapers in direction 61 of a beam displacement for decreasing target object distances 48. An envelope 165 of this type is also shown in FIG. 4. The envelope basically follows the boundary of the photosensitive subregions, and the course of the envelopes in the direction of arrow 61, i.e., in the direction of a beam displacement for decreasing object distances, is interpolated between two subregions.

Figure 5:
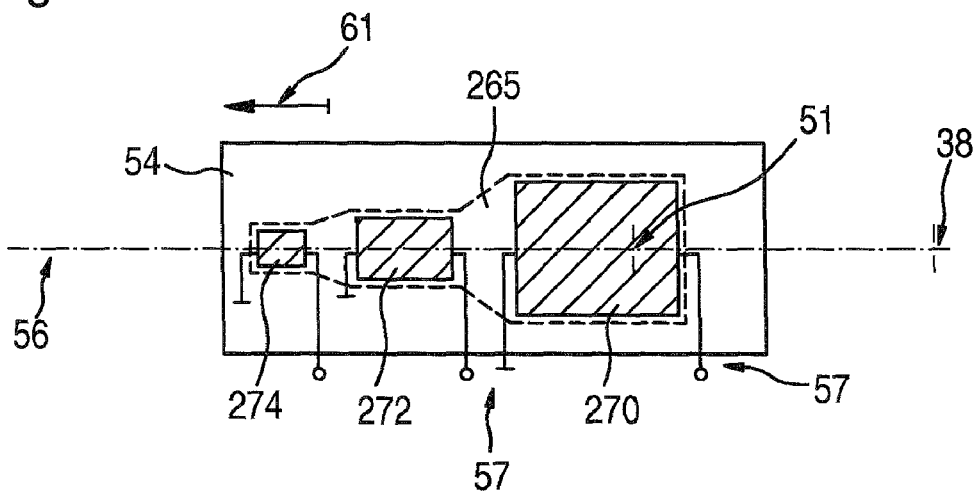
FIG. 5 shows a further embodiment of the detector of an inventive device, in a schematic illustration.

The shapes of the photosensitive surfaces and their number within a detector may vary according to the embodiment. For instance, FIG. 5 shows a detector with a plurality of rectangular photosensitive surfaces 270, 272, 274 of different sizes, whose envelope 265 tapers in direction 61 of a beam displacement for decreasing target object distances 48. According to the present invention, photosensitive surfaces 270, 272, 274 may be activated—i.e., switched on or off—individually when a distance measurement is performed.

Figure 6:
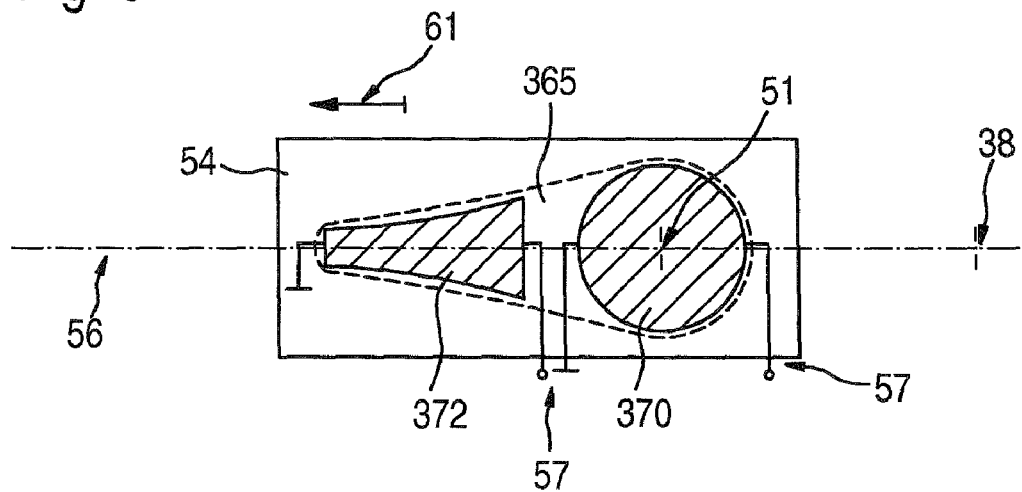
FIG. 6 shows a further embodiment of the detector of an inventive device, in a schematic illustration.

FIG. 6 shows a further embodiment with only two separate, photosensitive surfaces 370, 372, which may also be activated individually using the principle described above.

Figure 7:
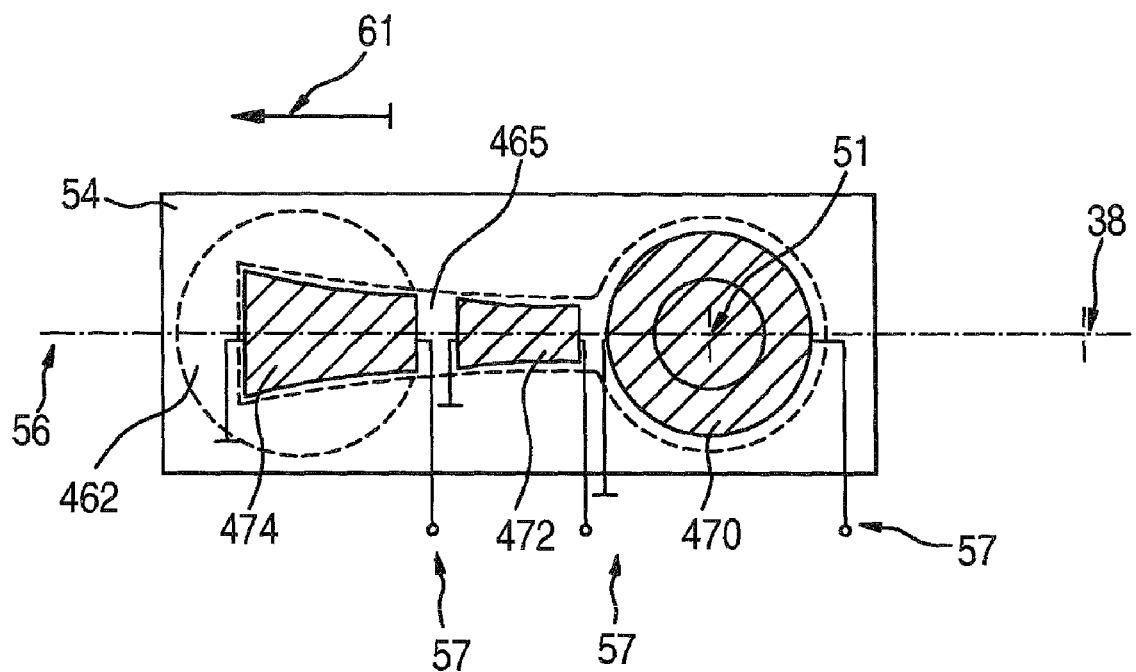
FIG. 7 shows a further embodiment of the detector of an inventive device, in a schematic illustration.

Basically, the envelope, which may also be placed around the photosensitive surfaces of the detector, may also expand in the direction of decreasing object distances. An embodiment of this type with an envelope that expands in direction 61—as shown, e.g., in FIGS. 7 and 8—has the advantage that it accounts for the reduced energy density of the returning measurement signal for short measurement object distances. Due to a short measurement object distance, the returning measurement beam bundle is no longer optimally focused in the detection plane, since collimation optics 52 of a measuring device of this type are typically optimized for very large measurement object distances. Since the measurement spot increases rapidly in the detection plane for decreasing measurement object distances—refer to the illustration in FIG. 2—a reduced energy surface density and/or intensity of the measurement signal results on the detector surface. A measurement spot 462 for short measurement object distances is shown in FIG. 7 as an example. In particular when an envelope of detector subregions tapers (see FIGS. 4 through 6), this behavior may result in only a small portion of the measurement spot striking the detector surface, and the detected measurement signal would therefore be relatively small. This effect of reduced energy density of the measurement signal on the detector surface may be offset by the fact that the detector surface expands in direction 61 as object distances decrease, or they expand after having been constricted, as depicted in the exemplary embodiment of an inventive detector shown in FIG. 7. Envelope 465 of photosensitive detector surfaces 470 and 472 and 474 widens in direction 61 as object distances decrease, after it has constricted in the region of the transition from subelement 470 to subelement 472. Within the framework of the disclosure of the present invention, a shape of this type should also meet the criterium that the photosensitive surfaces of the detector are designed and located such that an envelope of these areas expands in the direction of a beam displacement as target object distances decrease.

With specific embodiments of an inventive device, the number and/or shape of the individual photosensitive surfaces that a detector may have may deviate from the exemplary embodiment depicted in FIG. 7, of course. For instance, subelement 472 could also be rectangular in design, while other subelements 470 and 474 of the photosensitive surface have the shape shown in FIG. 7.

Depending on the design of the measuring device, the effect of the inverse square law and the effect of a more or less poor focusing—which occur as measurement object distances decrease, and which have an opposing effect on the intensity of the measurement signal—should be weighed against each other, and the optimized shape of the photosensitive surfaces should be found, in particular for the envelope of the photosensitive surfaces.

Figure 8:
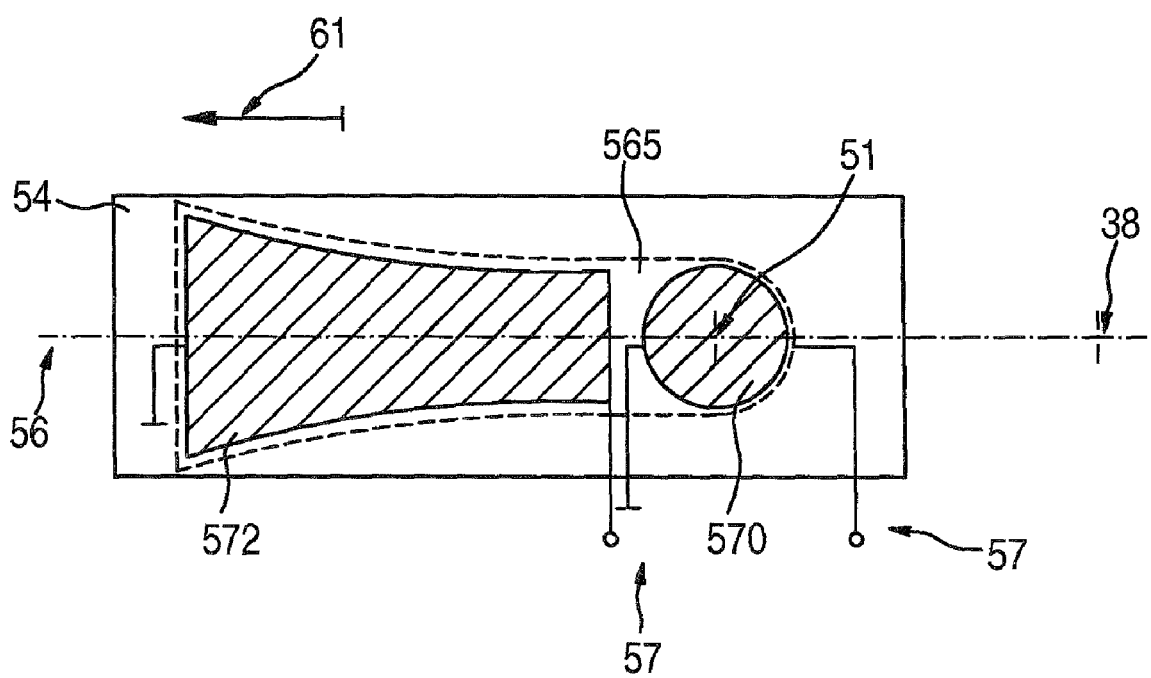
FIG. 8 shows a further embodiment of the detector of an inventive device, in a schematic illustration.

FIG. 8 shows another possible embodiment of the inventive idea, with only two photosensitive detector subregions 570 and 572, whose envelope 565 expands continually in direction 61, however, as object distances decrease.

Independently of the shape of the envelopes of the photosensitive surfaces, they may be activated individually, so that the inventive detector may be operated with only one or more subregions.

The inventive device is not limited to the embodiments presented in the description. In particular, the inventive device is not limited to the shapes and numbers of individual photosensitive subregions of the detector.

What is claimed is:

1. A hand-held device for optically measuring distance, with a transmission unit (12) that includes a light source (17, 18) for emitting optical measurement radiation (13, 20, 22) in a wavelength range visible to a human eye towards a target object (15), and with a receiving unit (14) that is located a distance to an optical axis (38) of the transmission unit (12) and includes at least one optical detector (54) for receiving optical radiation (16, 49, 50) reflected by the target object (15),
wherein the detector (54) of the receiving unit (14) includes a plurality of photosensitive surfaces (70, 72, 74; 170, 172, 174; 270, 272, 274; 370, 372; 470, 472; 570, 572), which are separated from each other and may be activated separately, and
wherein the photosensitive surfaces (170, 172, 174; 270, 272, 274; 370, 372) of the detector (54) are formed and/or positioned such that an envelope (165, 265, 365) of these surfaces (170, 172, 174; 270, 272, 274; 370, 372) tapers in the direction (61) of a beam displacement as the target object distances (48) decrease.

2. The device as recited in claim 1, wherein means (55) are provided for switching individual photosensitive surfaces (70, 72, 74; 170, 172, 174; 270, 272, 274; 370, 372; 470, 472; 570, 572) of the detector (54) on and off.

3. The device as recited in claim 1, wherein the photosensitive surfaces (70, 72, 74; 170, 172, 174; 270, 272, 274; 370, 372; 470, 472; 570, 572) of the detector (54) are formed and/or positioned such that an envelope (165, 265, 365, 465, 565) of these surfaces (70, 72, 74; 170, 172, 174; 270, 272, 274; 370, 372; 470, 472; 570, 572) has a larger expansion in the direction (61) of a beam displacement for decreasing target object distances (48) than it does in the orthogonal direction.

4. The device as recited in claim 1, wherein the envelope (165, 265, 365, 465, 565) of the photosensitive surfaces (70, 72, 74; 170, 172, 174; 270, 272, 274; 370, 372; 470, 472; 570, 572) of the detector (54) has a symmetry axis located in the common plane (56) of the optical axes of the transmission unit (38) and the receiving unit (51).

5. The device as recited in claim 1, wherein the expansion of the photosensitive surfaces (70, 72, 74; 170, 172, 174; 270, 272, 274; 370, 372; 470, 472; 570, 572) of the detector (54) is at least so great that the measurement spot (58) of the returning radiation (16, 49) from a target object (15) at a large object distance is detected in entirety.

6. The device as recited in claim 1, wherein the expansion of the photosensitive surfaces (70, 72, 74; 170, 172, 174; 270, 272, 274; 370, 372; 470, 472; 570, 572) of the detector (54) in the direction perpendicular to the optical axis (51) of the receiving unit (14) is at least so great that at least a portion of the measurement beam (50) returning from a target object (15) at close range still strikes the photosensitive surface (70, 72, 74; 170, 172, 174; 270, 272, 274; 370, 372; 470, 472, 570, 572).

7. The device as recited in claim 1, wherein the light source (17, 18) is a laser, in particular a laser diode (18).

8. A method for operating a device for optically measuring distance, as recited in claim 1,
wherein a detector (54) of a receiving unit (14) provided in the device includes a plurality (m) of separate, photosensitive surfaces (70, 72, 74; 170, 172, 174; 270, 272, 274; 370, 372; 470, 472; 570, 572), of which only a portion (n, with n<m) of the available photosensitive surfaces (70, 72, 74; 170, 172, 174; 270, 272, 274; 370, 372; 470, 472, 570, 572) is activated when a distance measurement is performed.

9. The method for operating a device for optically measuring distance as recited in claim 8,
wherein only one photosensitive surface (n=1) (70, 72, 74; 170, 172, 174; 270, 272, 274; 370, 372; 470, 472; 570, 572) of the detector (54) is active when a distance measurement is performed.

10. The method as recited in claim 9, wherein when a distance measurement is performed, only that photosensitive surface (70, 72, 74; 170, 172, 174; 270, 272, 274; 370, 372; 470, 472; 570, 572) of the detector (54) of the device is active that receives the largest portion of optical radiation (16, 49, 50) returning from a target object (15).

11. A method for operating a device for optical measuring device as recited in claim 1, wherein a detector (54) of a receiving unit (14) provided in the device includes a plurality (m) of separate from one another photosensitive surfaces (70, 72, 74; 170, 172, 174; 270, 272, 274; 370, 372; 470, 472; 570, 572), of which only a portion (m, with n<m) of the available photosensitive surfaces is activated when a distance measurement is performed.

12. A hand-held device for optically measuring distance, with a transmission unit (12) that includes a light source (17, 18) for emitting optical measurement radiation (13, 20, 22) in a wavelength visible to a human eye towards a target object (15), and with a receiving unit (14) that is located a distance away to an optical axis (38) of the transmission unit (12) and includes at least one optical detector (54) for receiving optical radiation (16, 49, 50) reflected by the target object (15),
wherein the detector (54) of the receiving unit (14) includes a plurality of photosensitive surfaces (70, 72, 74; 170, 172, 174; 270, 272, 274; 370, 372; 470, 472; 570, 572), which are separated from each other and may be activated separately, and
wherein the photosensitive surfaces (470, 472, 474; 570, 572) of the detector (54) are formed and/or positioned such that an envelope (465, 565) of these surfaces (470, 472, 474; 570, 572) expand in the direction (61) of a beam displacement as the target object distances (48) decrease.

* * * * *